Patented May 16, 1933

1,909,442

UNITED STATES PATENT OFFICE

ROGER WILLIAMS, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS FOR CATALYTIC SYNTHESIS

Application filed December 31, 1928. Serial No. 329,420.

This invention relates to methods of and apparatus for effecting catalytic gaseous reactions.

In carrying out exothermic gaseous reactions, as, for instance, the synthesis of ammonia from nitrogen and hydrogen or the synthesis of organic compounds from hydrogen and an oxide of carbon, it has been found advantageous to submit the gases to reaction in contact with a catalyst and, after replacement of the products by an equivalent portion of fresh gases, to pass the gaseous mixture again over the catalyst to effect further reaction. Processes of this nature are generally referred to as cyclic processes.

Generally speaking, in order to obtain the most satisfactory results in catalytic reactions great care must be taken to remove as completely as possible from the fresh gases going to the reaction all substances that tend to decrease the activity of the catalyst. It is frequently the case that the gases employed contain catalyst poisons of such a character as to make their complete removal difficult by ordinary means. It has been found heretofore that this final purification may be satisfactorily effected by submitting the fresh gaseous mixture directly before the synthesis to the action of a heated contact mass adapted to remove the catalyst poisons from the gases or to convert them into innocuous or easily removable substances. Thus, for instance, in the synthesis of ammonia from a nitrogen-hydrogen mixture containing small amounts of oxides of carbon the final purification of the gaseous mixture has been accomplished by passage thereof over a heated catalyst adapted to accelerate the interaction of hydrogen and oxides of carbon to form methane and water. The water can be removed by condensation and the methane has little or no effect upon the course of the ammonia synthesis except to the extent that it acts as a diluent of the reacting gases. On the other hand, in the synthesis of hydrocarbons or oxygenated organic compounds from hydrogen and an oxide of carbon, the final purification of the gaseous mixture may be accomplished by passage thereof over a heated contact mass adapted to remove sulphur compounds from the gases. This contact mass may function simply by absorbing hydrogen sulphide or, if organic sulphur compounds are also present, a contact mass may be used which will serve to convert the organic sulphur compounds to hydrogen sulphide and also to absorb the latter.

A common characteristic of these methods of final gas purification is that the contact mass is maintained at an elevated temperature. Inasmuch as the amounts of impurities being eliminated are relatively small, any heat developed by the purification reaction is insufficient to bring the gases to the temperature at which the contact mass must be maintained. The prior method of effecting the purification in a separate contact apparatus preceding the main catalytic converter has required, therefore, the provision not only of this separate apparatus but also of means for heating the same and for regulating its temperature to compensate for inevitable fluctuations in the temperature and composition of the gases being treated. This requirement has contributed to the complexity and difficulty in operation of the synthesis as a whole and also, especially where the reaction is effected at an elevated pressure, has added considerably to the cost of plant equipment.

With a view to eliminating these and other difficulties heretofore encountered it is the object of the present invention to provide an improved cyclic process for effecting catalytic exothermic gaseous reactions wherein the final purification of the gases is accomplished by passage thereof over a heated contact mass.

It is a further object to provide an improved apparatus for carrying out processes of the character described.

Other objects and advantages of the invention will be apparent as it is more fully understood by reference to the following specification and to the accompanying drawings in which—

In accordance with the present invention, in cyclic processes for effecting catalytic gaseous reactions at elevated temperatures, and especially exothermic reactions, the gaseous reactants are contacted with the hot catalyst for the principal reaction and then, while hot, are mixed with the make-up gas (that is, the fresh gas added to replace the products formed), and the resulting hot gaseous mixture is passed over a purifier contact mass, preferably disposed in heat exchange relation to the catalyst for the main reaction. After the purification the gaseous mixture is treated for removal of the products, for example by condensation thereof, and the gases are then subjected as before to contact with the same or a similar catalyst for the main reaction, the addition of the make-up gas, the purification thereof and the separation of products of the reaction being thereafter continuously effected in the manner indicated.

By proceeding in the foregoing manner the heat of the gaseous products of the main reaction can be utilized for maintenance of the temperature required for operation of the purifier contact mass. In view of the relatively large quantity of heat thus made available the purifier mass may always be kept at a sufficiently elevated and substantially uniform temperature with little or no necessity for regulation thereof due to temporary fluctuations in the quantity of impurities contained in the make-up gas. Also where, as may advantageously be the case, the purifier mass is disposed in the same apparatus as the catalyst for the main reaction and in heat exchange relation thereto, the reduction in size and cost of the equipment and the more compact arrangement thereof contribute considerably to the economy and efficiency of the whole process.

Figure 1:
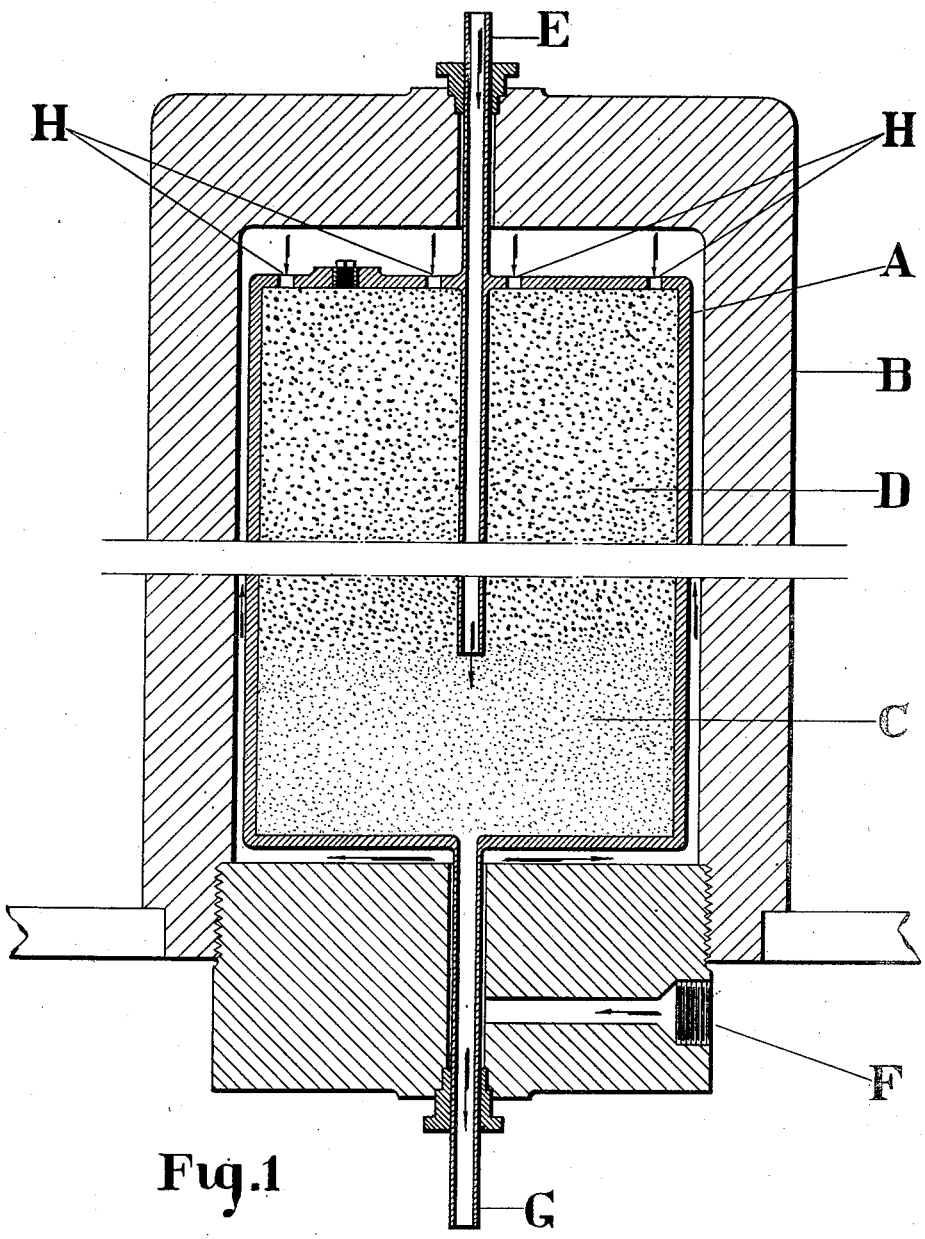
Figure 1 is a cross-sectional view of one form of apparatus adapted for use in the practise of the invention and—
Figure 2:
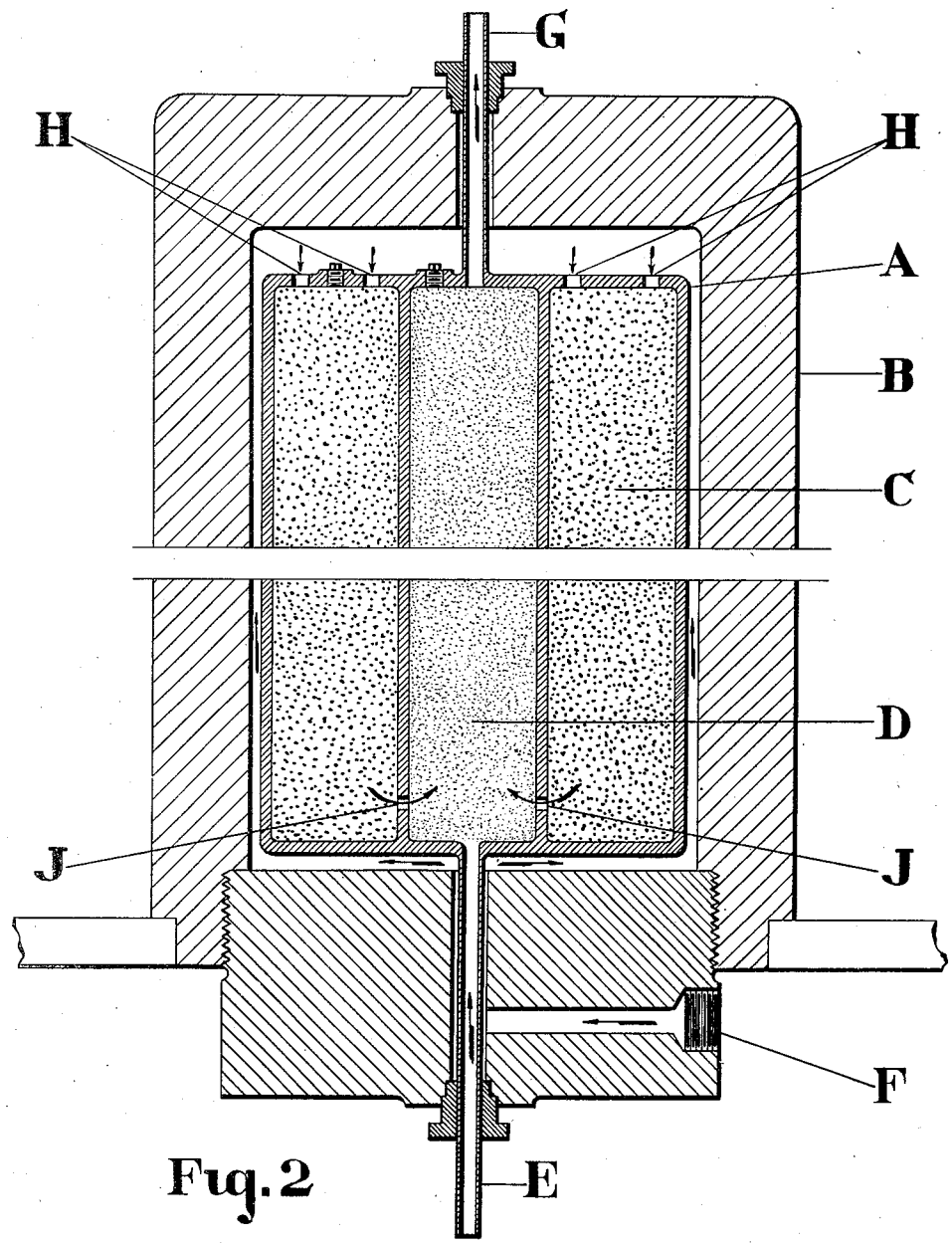
Figure 2 is a similar view of another form of apparatus.

The nature of my invention, as well as the advantages described and others that will be obvious to those skilled in the art, will be made clear by reference to the following statement of a particular mode of application of the invention and to the accompanying drawings in which Figures 1 and 2 diagrammatically illustrate two forms of apparatus adapted for such application.

Referring to Figure 1 of the drawings, the apparatus comprises a pressure-sustaining wall B enclosing a reaction chamber A containing two bodies of contact material. The upper body, D, is the catalyst for the main reaction and the lower one, C, is a purifier contact mass. In employing the apparatus for the synthesis of ammonia the fresh mixture of nitrogen and hydrogen (i. e. the make-up gas), containing small amounts of carbon monoxide and compressed to a suitable pressure, enters the apparatus through the conduit E, and flowing through the latter is warmed by heat exchange with the ammonia synthesis catalyst D before being introduced to the contact mass C. Meantime a compressed gaseous mixture, that has already been subjected to partial reaction and from which ammonia has been removed, is admitted through the opening F, whence it flows up around the reaction chamber A and between it and the pressure-sustaining wall; thereby simultaneously being warmed and protecting the wall B from the heat of the reaction. These gases enter the reaction chamber by way of a plurality of orifices H and while passing down over the catalyst D react to form ammonia. At the lower end of the conduit E these hot gases are mixed with the make-up gas entering through said conduit and the resultant gaseous mixture passes down over the contact mass C, by means of which the carbon monoxide is converted to methane and water. The hot gaseous mixture leaves the apparatus through the outlet G and is treated in apparatus not shown, for removal of ammonia and the small amount of water formed. The gaseous residue, now free from carbon monoxide, is returned to the same or a similar apparatus to be admitted at F and treated as previously indicated.

The catalyst D may be any catalyst suitable for the synthesis of ammonia. The contact mass C is a methane-forming catalyst and for this purpose various known catalytic compositions may serve, those containing iron, nickel or cobalt being particularly suitable. I prefer, however, to employ contact bodies D and C of the same composition, this being possible since, generally speaking, iron-containing ammonia synthesis catalysts are also excellent catalysts for methane formation. Thus, for example, D may be fresh, active ammonia synthesis catalyst and C may be used or spent ammonia catalyst; a catalyst that is no longer sufficiently active for ammonia synthesis being usually suitable for use as a methanation catalyst. As an example of a catalyst composition that may be employed for this dual purpose, I mention the catalyst prepared by fusing and reducing a mixture of iron oxide, potassium oxide and aluminum oxide in accordance with the U. S. Patent No. 1,489,497 of Alfred T. Larson.

The temperature at which the contact materials in the reaction chamber A should be maintained may vary somewhat depending particularly upon the nature of the contact materials employed. With a catalyst of the composition just referred to a temperature of about 500–550° C. is suitable. It will be obvious to those skilled in the art that suitable means, such as external heat exchange devices, may be provided for bringing the gases to the desired temperature before admitting them to the apparatus.

Figure 2 illustrates another form of apparatus characterized by an arrangement affording better heat exchange between the purifier contact mass and the catalyst for the main reaction. The apparatus comprises a reaction chamber A enclosed within a pressure-sustaining wall B. The reaction chamber is divided into two parts the annular outer section containing a body of catalyst C, for the main reaction, and the cylindrical inner compartment containing a body of purifier contact material, D. The operation proceeds essentially in the manner indicated for the first described apparatus.

The gases which have already been submitted to reaction and from which the products have been removed are admitted through the inlet F, and passing upward through the annular space between the pressure-sustaining wall B and the catalyst container A they enter the latter through the orifices H. Passing down over the catalyst C the gases undergo reaction and, after traversing this body of catalyst, enter the inner compartment of the reaction chamber through the orifices J. In this compartment they are mixed with the make-up gas which flows in through the conduit E. The combined gaseous mixture then passes upward over the purifier mass D, by means of which the desired purification of the make-up gas is effected, and the gaseous mixture leaves the apparatus through the outlet G. After removal of the products from the gaseous mixture by suitable means, not shown, the gaseous mixture is returned to the same or a similar apparatus for further treatment in the way described. As indicated in the case of the apparatus previously referred to, suitable means may be provided for preheating the gases so that they will be at the necessary temperature on entering the reaction chamber.

It will be observed that with this type of apparatus the placing of the purifier mass within and in heat exchange relation to the catalyst for the main reaction contributes to the maintenance of a uniform temperature in the purifier mass, since the latter is heated not only by the hot gases coming into contact therewith but also by heat exchange with the main body of catalyst.

If desired, the relative arrangement of purifier mass and catalyst for the main reaction may be reversed, the latter being within and in heat exchange relation to the former. For example, referring to Figure 2 of the drawings the positions of the contact bodies C and D may be exchanged and the make-up gas admitted at F and the recirculated gas at G.

Although the forms of apparatus illustrated have been described with particular reference to their use in the synthesis of ammonia it will be obvious that the invention is not limited to this specific reaction, but is applicable also to other reactions where the difficulties the invention is designed to correct may be encountered. It will be apparent to those skilled in the art that, for example, in the synthesis of hydrocarbons, and oxygenated organic compounds from hydrogen and oxides of carbon, the final purification of the make-up gas from sulphur compounds may be accomplished by proceeding in accordance with the principles hereinbefore set forth. As purifier contact mass there may be employed in this instance a mixture of copper and zinc oxides prepared, for example, by briquetting and reducing a co-precipitated mixture of copper oxide and zinc oxide. This material will effectively remove the small quantities of sulphur compounds present in the gases that are to react. As in the case of ammonia synthesis so also with this specific type of reaction the catalyst for the main reaction and the purifier catalyst may be of the same composition; a mixture of oxides of copper, chromium and zinc, for example, will perform both functions.

Various changes may be made in the method and apparatus described without departing from the invention or sacrificing any of the advantages thereof.

I claim:

1. The cyclic process of effecting a gaseous reaction which comprises successively contacting a mixture of gaseous reactants with a hot catalyst for said reaction; adding make-up gas to the hot gases; contacting the resultant gaseous mixture with a purifier material; removing reaction products from the gases and contacting the latter again with a catalyst for said reaction.

2. The cyclic process of effecting a gaseous reaction which comprises successively contacting a mixture of gaseous reactants with a hot catalyst for said reaction; adding fresh gaseous mixture to the hot gases; contacting the resultant gaseous mixture with a purifier material in heat exchange relation to said catalyst; removing reaction products from the gases and contacting the latter again with a catalyst for said reaction.

3. The cyclic process of effecting a gaseous reaction which comprises successively contacting a mixture of gaseous reactants with a hot catalyst for said reaction; adding fresh gaseous mixture to the hot gases; passing the resultant gaseous mixture within and in heat exchange relation to said catalyst, but not in direct contact therewith, and simultaneously in contact with a purifier material; removing reaction products from the gases and contacting the latter again with a catalyst for said reaction.

4. The cyclic process of effecting a gaseous reaction which comprises successively contacting a mixture of gaseous reactants with a hot catalyst for said reaction; adding fresh gaseous mixture to the hot gases; contacting the resultant gaseous mixture with a purifier material; removing reaction products from the gases and contacting the latter again with said catalyst.

5. The cyclic process of producing ammonia which comprises successively contacting a gaseous mixture of nitrogen and hydrogen with a hot ammonia synthesis catalyst; adding make-up gas to the hot gases; contacting the resultant gaseous mixture with a purifier material; removing reaction products from the gases and submitting the latter to further synthesis.

6. The cyclic process of producing ammonia which comprises successively contacting a gaseous mixture of nitrogen and hydrogen with a hot ammonia synthesis catalyst; adding make-up gas contaminated with oxide of carbon to the hot gases; contacting the resultant gaseous mixture with a methanating catalyst; removing reaction products from the gases and submitting the latter to further synthesis.

7. In a cyclic process for effecting a catalytic gaseous reaction by contacting with a catalyst a recirculated mixture of gaseous reactants which has already been subjected to partial reaction and from which the resultant products of reaction have been removed, the step of adding incompletely purified make-up gas to the recirculated gaseous mixture while the latter is undergoing reaction but before it has completely traversed the catalyst.

8. In a cyclic process for effecting the catalytic synthesis of ammonia from its elements by contacting with a catalyst a recirculated mixture of gaseous reactants which has already been subjected to partial reaction and from which the resultant products of reaction have been removed, the step of adding incompletely purified make-up gas to the recirculated gaseous mixture while the latter is undergoing reaction but before it has completely traversed the catalyst.

In testimony whereof, I affix my signature.

ROGER WILLIAMS.